United States Patent [19]

Shirakura et al.

[11] Patent Number: 4,474,468
[45] Date of Patent: Oct. 2, 1984

[54] METHOD OF AND APPARATUS FOR MEASURING LASER BEAM

[75] Inventors: Toshiharu Shirakura, Tokai; Hiroyuki Sugawara, Hitachi; Kouji Kuwabara, Hitachi; Kouji Sasaki, Hitachi; Satoshi Takemori, Hitachi, all of Japan

[73] Assignee: Hitachi, Ltd., Tokyo, Japan

[21] Appl. No.: 302,433

[22] PCT Filed: Apr. 15, 1981

[86] PCT No.: PCT/JP81/00089
§ 371 Date: Sep. 9, 1981
§ 102(e) Date: Sep. 9, 1981

[87] PCT Pub. No.: WO81/03068
PCT Pub. Date: Oct. 29, 1981

[30] Foreign Application Priority Data

Apr. 18, 1980 [JP] Japan .................. 55-50467

[51] Int. Cl.³ .................. G01B 11/14; G01J 1/00; G01J 1/44; G01R 1/073
[52] U.S. Cl. .................. 356/375; 324/65 P; 324/149; 356/73; 356/121; 356/215; 356/222
[58] Field of Search .................. 356/73, 121-123, 356/215-216, 222, 234-235, 375, 399; 250/211 K, 342; 324/65 P, 149, 95-96; 219/121 LZ; 338/15, 17-18; 374/185

[56] References Cited

U.S. PATENT DOCUMENTS

| 1,229,740 | 6/1917 | Furstenau | 356/219 |
| 2,427,094 | 9/1947 | Evans | 324/95 |
| 2,633,525 | 3/1953 | Wells | 356/121 |
| 3,118,062 | 1/1964 | Ilgenfritz et al. | 250/342 |
| 3,182,262 | 5/1965 | Schumann | 324/95 |
| 3,649,840 | 3/1972 | Thorn et al. | 250/211 K |
| 3,694,746 | 9/1972 | Hopfer | 324/95 |
| 3,878,500 | 4/1975 | Svechnikov et al. | 338/15 |

FOREIGN PATENT DOCUMENTS 1564270 4/1969 France .
234484 5/1969 U.S.S.R. .................. 324/95

OTHER PUBLICATIONS

Morrison, S. R. "A New Type of Photosensitive Junction Device" Solid State Electronics, Pergamon Press, 1963, pp. 485-494.
Hofper, S. "The Design of Broad-Band Resistive Radiation Probes" IEEE Trans on Instru. & Measurement, 11-1972, pp. 416-421.
Wacker et al. "Quantifying Hazardous Electromagnetic Fields: Scientific Basis & Practical Considerations" IEEE Trans. on Microwave Theory & Tech. 7-1971, pp. 178-187.
Bassen et al. "Em Probe with Fiber Optic Telemetry System" Microwave Jr. 4-1977, pp. 35, 38-39.
Siekman et al. "A Simple Power-Output Meter Specially Designed for Continuous Laser Beams" Philips Res. Repts 23, 1968, pp. 375-387.
Quinn, A. A., "A Rapid Inexpensive Method for Determining the Spatial Intensity Distribution of a Laser Beam", Review of Sci. Instrm. 1971, pp. 981-982.
Blum et al., "Beam Position & Intensity Analyzing Device", IBM Tech. Disc. Bull., 3-1970, pp. 1594-1595.

Primary Examiner—William H. Punter
Attorney, Agent, or Firm—Antonelli, Terry & Wands

[57] ABSTRACT

According to the invention, a thin wire 13 is arranged across the laser beam 2, and the change of resistance in the thin wire 13 is measured by a resistance meter 21 while moving the thin wire 13 by a driving mechanism 23, thereby to measure the power of the laser beam or the position of the laser beam. The apparatus can be used for monitoring the power of laser beam or position of the same used in the high-power laser device for processing or the like purpose. According to the invention, it is possible to monitor the power and position of the laser without interrupting the laser beam and without incurring substantial increase of the loss of power of the laser beam.

1 Claim, 9 Drawing Figures

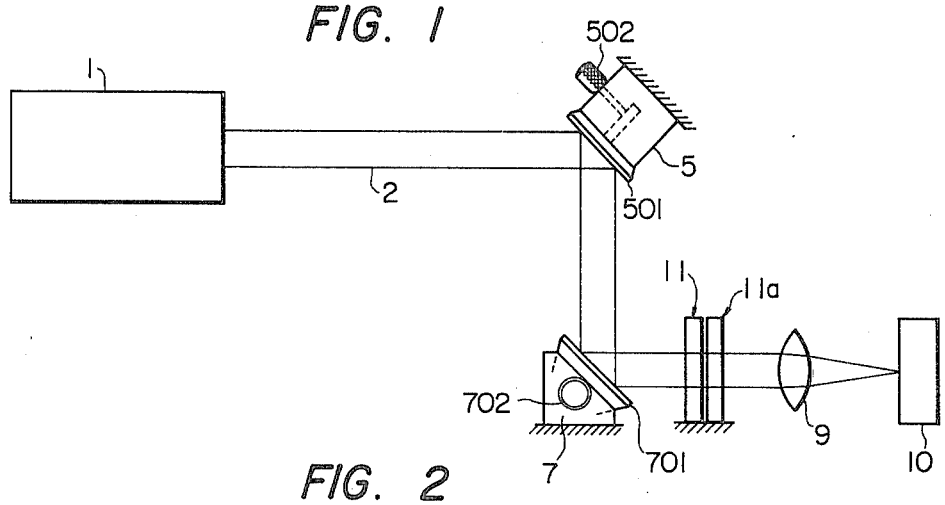
FIG. 1
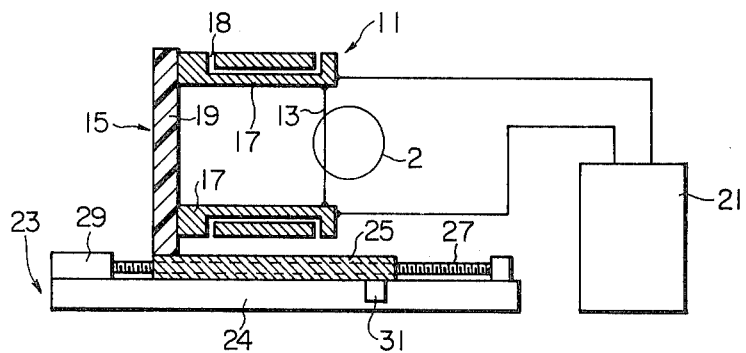
FIG. 2
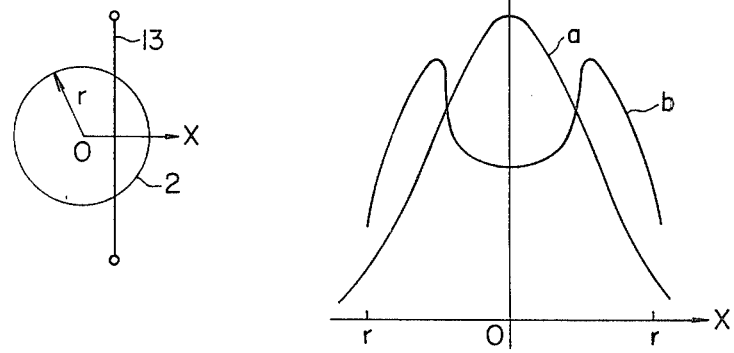
FIG. 3
FIG. 4

METHOD OF AND APPARATUS FOR MEASURING LASER BEAM

TECHNICAL FIELD

The present invention relates to a method of and apparatus for measuring a laser beam and, more particularly, to a laser beam measuring method and apparatus in which an object having a resistance that is variable in response to temperature is disposed in the laser beam of high level of energy and the power and position of the laser beam are measured through the measurement of the resistance of the object.

BACKGROUND ART

In effecting a processing such as welding, cutting, surface treatment or the like by a laser processing device, the laser beam is emitted from a laser oscillator and the path of beam is changed by a reflective mirror, while focusing the beam by a lens on the work to be processed. The power of the laser beam emitted from the oscillator affects the workability of the work. It is, therefore, necessary to measure the power of the laser beam. One of the known methods of measuring the power is to use a detachable full-reflecting mirror, a "shutter", in the path of the laser beam and to measure the laser beam reflected by this mirror using a power meter. This method, however, cannot be used without interrupting the processing, because the beam path is intercepted during the measurement of the power.

Japanese Patent Laid-open No. 99792/1978 shows, particularly at FIG. 1 attached thereto, a method of continuously monitoring the power of the laser beam. This method makes use of a half-transmissive mirror adapted to reflect a part of the laser beam and the reflected beam is monitored. This method is also unsatisfactory in that the power of the laser beam is lost undesirably by the half-transmissive mirror disposed in the path of laser beam.

Furthermore, this type of laser beam device involves a problem that the path of the laser beam to be directed to the work is undersirably deviated due to slight inclination or offset of the mirrors incorporated in the optical system, attributable to a temperature change. This problem is serious particularly in the laser device for production purposes, because the laser source in such device is usually located at a distance from the work to inconveniently amplify the offset of the beam path. Namely, even a small deviation at the laser source causes an unacceptably large offset at the position of the work. This offset of the beam path causes not only the position of application of the beam onto the work, but also a deviation of a part of the laser beam from the effective plane of the optical system resulting in a scattering of the laser beam, i.e. a lowered efficiency of use of the laser power, to deteriorate the processing performance of the laser power.

DISCLOSURE OF THE INVENTION

Accordingly, an object of the invention is to provide a method of and apparatus for continuously measuring or detecting the power or position of the laser beam without interrupting the latter.

Another object of the invention is to provide a method of and apparatus for measuring a laser beam that is capable of measuring or detecting the power or position of the laser beam at an extremely reduced level of power loss of the laser beam.

To these ends, according to the invention, the power of the laser beam or the position of the beam path are detected through measurement or detection of a change in the resistance in an elongated object disposed in the laser beam.

The position of the laser beam can be detected by, for example, causing a relative motion between the laser beam and the object disposed in the laser beam. Namely, the distribution of the resistance change corresponding to the distribution of intensity of the laser beam is known as a result of this relative motion. Also, the laser beam power is known from the distribution by, for example, integrating the distribution of laser beam.

BRIEF DESCRIPTION OF THE DRAWINGS

FIG. 1 is a schematic illustration of a laser processing device incorporating a laser beam measuring apparatus constructed in accordance with an embodiment of the invention;

FIG. 2 is a sectional view of a laser beam measuring apparatus shown in FIG. 1;

FIG. 3 is an illustration of the relationship between a thin wire incorporated in the apparatus shown in FIG. 2 and the laser beam;

FIG. 4 is a graphical representation of the distribution of resistance change in response to the laser beam;

BEST MODE FOR CARRYING OUT THE INVENTION

Figure 5:
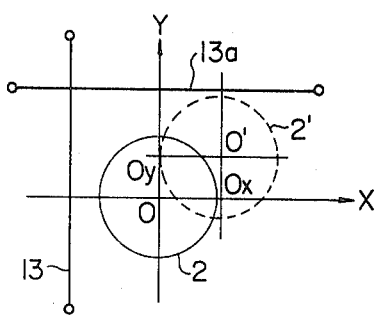
FIG. 5 is an illustration of relationship between the thin wire and the laser beam.

A laser beam measuring apparatus constructed in accordance with an embodiment of the invention will be described hereinunder with reference to FIGS. 1 to 7.

Referring first to FIG. 1 showing a laser processing device such as for welding, cutting, surface treatment or the like purpose, a laser 1 is constituted by an exciting region, concaved mirror and an output mirror, and is adapted to emit a laser beam 2 which is directed toward a reflecting mirror devices 5 and 7 successively. The reflecting mirror devices 5 and 7 are provided, respectively, with full-reflecting mirrors 501,701 inclined at 45° to the laser beam 2 and rotary driving means 502,702 adapted to rotate these mirrors around axes parallel to the planes of these mirrors. The laser beam 2 emitted from the full-reflecting mirror 7 is directed toward the lens 9 and is focused on a work 10 to be processed.

The laser beam measuring apparatus 11, having a construction shown in FIG. 2, is disposed in the path of the laser beam between the full-reflecting mirror device 7 and the lens 9. The apparatus comprises a thin wire 13 disposed across the laser beam 2, a frame in support of the wire 3 and a driving mechanism. The thin wire 13 is made from a material which varies its electric resistance in accordance with temperature changes such as, for example, gold, platinum, copper plated with gold or platinum and so forth. The thin wire 13 preferably has such a shape as to minimize the amount of laser beam interrupted by the wire 13, i.e. a circular cross-section, although the thin wire can have any other cross-sectional shape. In the case where the thin wire 13 has a rectangular cross-section, it is placed such that the thicknesswise direction thereof coincides with the direction of running of the laser beam.

The frame 15 is constructed to have a U-like form with a pair of holders 17 spaced from each other and an insulator 19. The pair of holders 17 are electrically insulated from each other by the insulator 19. The thin wire 13 is secured at both of its ends to the holders 17 by welding, soldering or the like measure. This holder 17 is made from a material having a high heat conductivity and is provided therein with a water channel 18 through which cooling water is circulated to cool the holder 17 down to a substantially constant temperature. This is because the holder is heated by the heat conducted from the thin wire 13 and, in consequence, the thin wire itself is heated gradually to hinder the correct measurement of the change of resistance due to the incoming laser beam.

The driving device 23 has a base 24, a movable table 25 adapted to slide on the base 24, a screw rod 27 engaging a threaded bore formed in the movable table and a motor 29 connected to the screw rod 27 to drive the latter. The movable table 25 is adapted to be moved in the X-direction in response to the direction of rotation of the motor 29, i.e. in the axial direction of the screw rod shown in FIG. 2. The frame 15 is fixed to the movable table and is adapted to be moved together with the latter.

The laser beam measuring apparatus of the invention having the construction heretofore described operates in a manner explained hereinunder.

The laser beam 2 emitted from the laser 1 is directed through the optical system including a reflecting mirrors 501, 701, focusing lens 9 and so forth toward the work 10 to be processed. In this state the movable table 25 is driven in the X-axis direction as the result of operation of the motor 29, so that the thin wire 13 moves transversely of the laser beam 2 at a right angle to the latter as shown in FIGS. 2 and 3. The thin wire 13 receives the laser beam by an amount corresponding to the cross-sectional area occupied by the thin wire, and is heated to raise its temperature. The resistance of the thin wire 13 is changed in accordance with the change in the temperature, and this change of resistance is measured by a resistance meter 21.

As will be understood from FIG. 3, as the thin wire 13 placed in the laser beam 2 is moved in the X direction or, alternatively, as the laser beam 2 is moved in the X-axis direction by the operation of the rotary device 502 while keeping the thin wire 13 stationary, the amount of the laser beam received by the thin wire 13 is varied depending on the position of the thin wire 13, so that different portions exhibit different degrees of temperature rise so that the resistance value varies along the length of the thin wire.

In this case, the calculated value $\Delta R$ of the resistance change has a relation as shown in FIG. 4 to the position of the thin wire in the X-axis direction. The curve (a) shows the characteristics as observed when the laser beam exhibits a Gauss distribution, while the curve (b) shows the characteristics as observed when the laser beam exhibits an annular distribution. The resistance change $\Delta R$ is substantially in proportion to the power of the laser beam received by the thin wire 13. Therefore, the distribution of the resistance change $\Delta R$ as shown in FIG. 4 corresponds to the intensity distribution of the laser beam 2. The center O of the laser beam is easily found out as the peak point of resistance value $\Delta R$ in the case of the characteristics curve (a) whereas, in the case of the characteristic curve (b), as the most concaved point. By integrating this distribution and making a calibration, it is possible to know the absolute value of the power of the laser beam as a whole.

An experimental measurement of the laser beam power was conducted using a gold-plated copper thin wire having a diameter and length of 0.12 mm and 5.5 mm, and a $CO_2$ laser as the laser 1. The thin wire exhibited resistance values of 75 m$\Omega$ and 90 m$\Omega$, respectively, at the end of laser beam spaced by (r) from the center O and at the center O, when the level of the laser beam power is 2 KW.

The resistance values in relation to the positions were inputted as electric signals into an X-Y recorder to obtain a distribution curve as shown by (a) in FIG. 4. In this case, the scanning speed of the thin wire 13 was set at 3 mm/sec, but the scanning speed can be increased up to about 10 mm because the time constant of the thin wire in relation to temperature is about 10 m/sec. The reduction of the power due to insertion of the thin wire 13 into the laser beam 2 is not greater than 1%, and no substantial influence of insertion of the wire 13 was observed even after a restriction by the lens 9. It was also confirmed that the value obtained by integrating this distribution is proportional to the laser power.

The measurement or detection of the center of the laser beam is effected by a resistance meter 21 and a position detector 31.

The position detector has two parts fixed to the base 24 and the movable table 25 to measure the movement of the movable table 25. The movement of the table 25 in the X-axis direction is followed by the movement of the thin wire 13 in the same direction. The resistance meter 21 detects the maximum resistance change value in the case of the Gauss distribution (a) and the most concaved point in the case of the annular distribution. The position of the table 25 at which the maximum change or most concaved point is observed is the position of the center O of the laser beam. It is thus possible to detect or measure the center of the laser beam.

In the case where it is required to correct the path of laser beam 2 or the center of the latter, this can be achieved by, for example, operating the rotary device of the reflecting mirror device 5 so as to rotate the reflection mirror 501. This position can be detected by the laser beam measuring apparatus 11.

The system shown in FIG. 1 is further provided with a laser beam measuring device 11a having a construction substantially identical to the apparatus 11. In this apparatus, however, the thin wire 13a (FIG. 5) is arranged at a right angle to the thin wire 13 of the apparatus 11, and is moved by a driving device in the direction of arrow Y.

Figure 6:
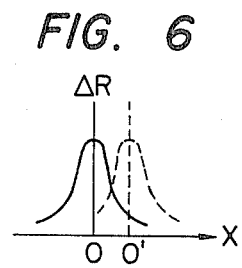
FIGS. 6 and 7 are distribution diagrams of resistance change.
Figure 7:
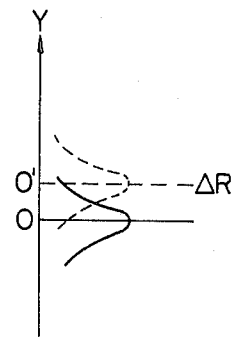

Assuming here that the position of the center O of the laser beam 2 is deviated to a position O', the resistance changes $\Delta R$ in the thin wires 13, 13a are shifted from the positions shown by full-lines in FIGS. 6 and 7 to positions shown by broken-lines in the same Figures. In consequence, the deviated position O' can be detected by shifting the thin wires 13 and 13a by distances OOx and OOy, respectively.

The value of integration of the resistance change ΔR as measured along the Y-axis also in proportion to the power of the laser beam.

Figure 8:
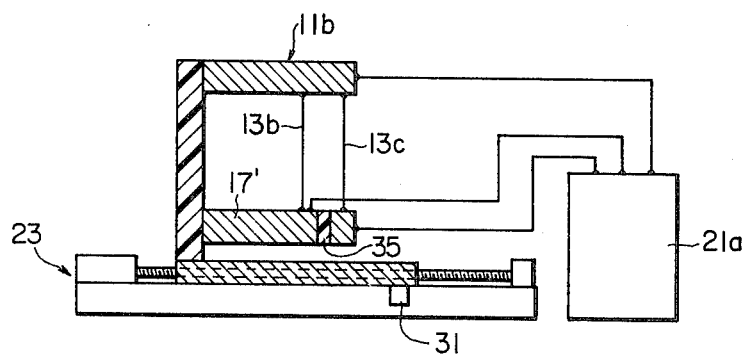
FIG. 8 is a sectional view of a laser beam measuring apparatus constructed in accordance with another embodiment of the invention.
Figure 9:
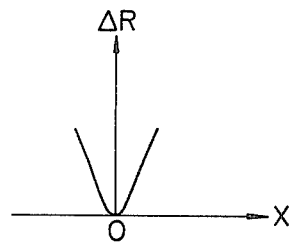
FIG. 9 is an illustration of a relationship between the resistance change and the position of center of the laser beam.

FIGS. 8 and 9 show another embodiment of the invention.

Referring to FIG. 8, the laser beam measuring apparatus 11b of this embodiment has a construction identical to that of the apparatus 11 of the first embodiment excepting that the frame 15 carries two parallel thin wires 13b,13c spaced from each other and disposed in the laser beam 2. These two thin wires are electrically connected at one of their one ends through a support while the other ends are insulated from each other by an insulator 35. These thin wires 13b,13c are connectd to a resistance meter 21a capable of measuring the difference between the resistance change in the thin wire 13b and that in the wire 13c.

In order to detect the center of the laser beam with this apparatus, the thin wires 13b,13c are moved in such a manner as to negate the difference between the resistances. The position at which the difference of the resistance becomes zero is the position of the center of the laser beam. The apparatus of this embodiment permits an easier detection of the center over the apparatus of other embodiments.

As has been described, according to the invention, it is possible to measure of detect the power of the laser beam or position of the center of the laser beam directed toward a work, without substantially interrupting the laser beam and, hence, without necessitating the suspension of the processing by the laser beam while eliminating substantial loss of the power of the laser beam.

What is claimed is:

1. A method of measuring a laser beam comprising: placing two thin elongated members in parallel with and at a distance from each other across said laser beam; such that said thin elongated members receive said laser beam simultaneously; and producing relative movement between said thin elongated members and said laser beam in such a manner as to negate the difference of change of resistance of said thin elongated members, to detect the center position of said laser beam.

* * * * *